(No Model.)  9 Sheets—Sheet 1.
J. G. PAVYER.
TYPE MACHINE.
No. 495,703. Patented Apr. 18, 1893.
Fig. I.
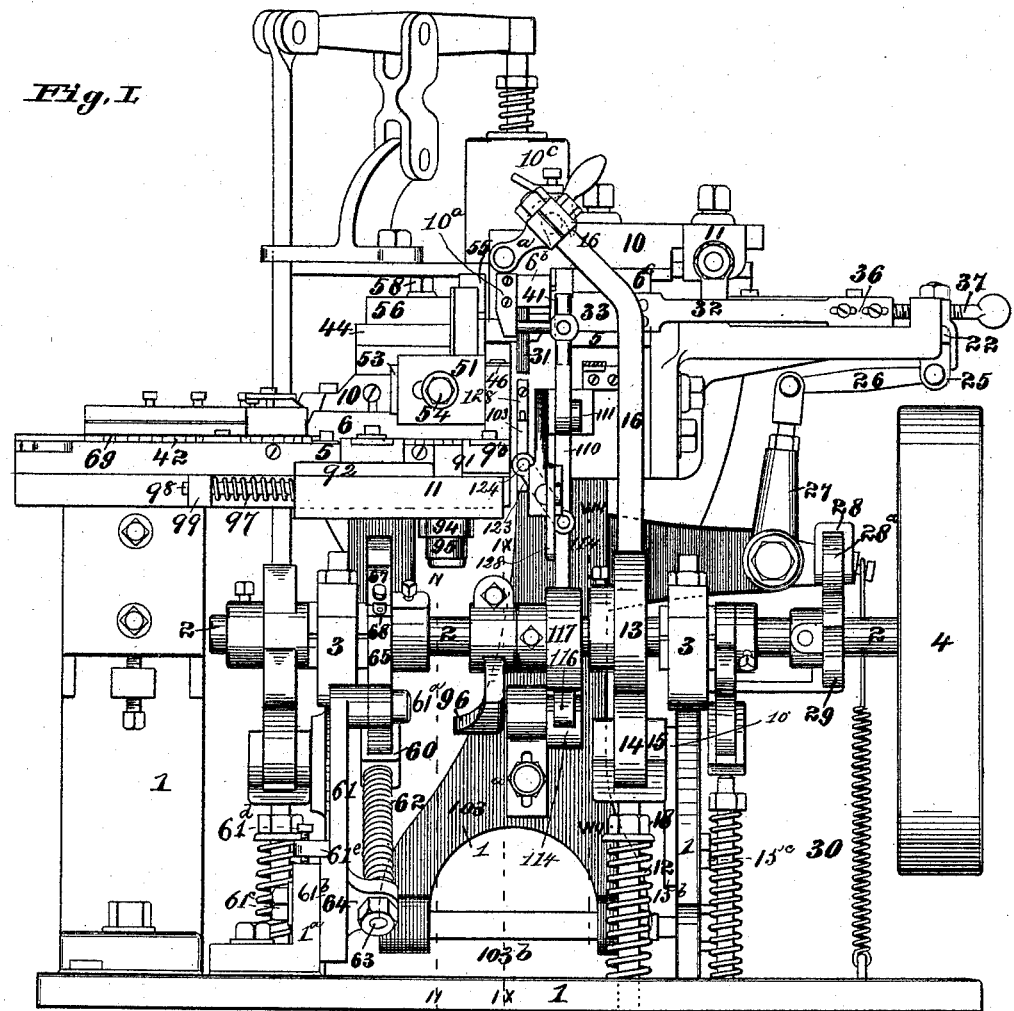
Fig. II.
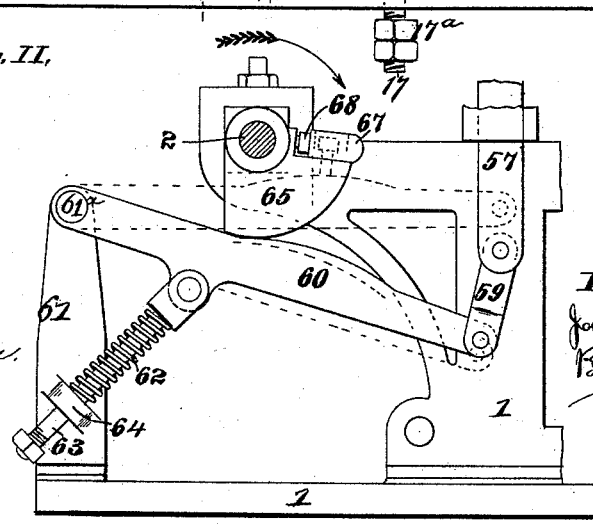
Attest:
Harry T. Rohrer
George E. Cross
Inventor:
James G. Pavyer
By Knight Bros
Attys

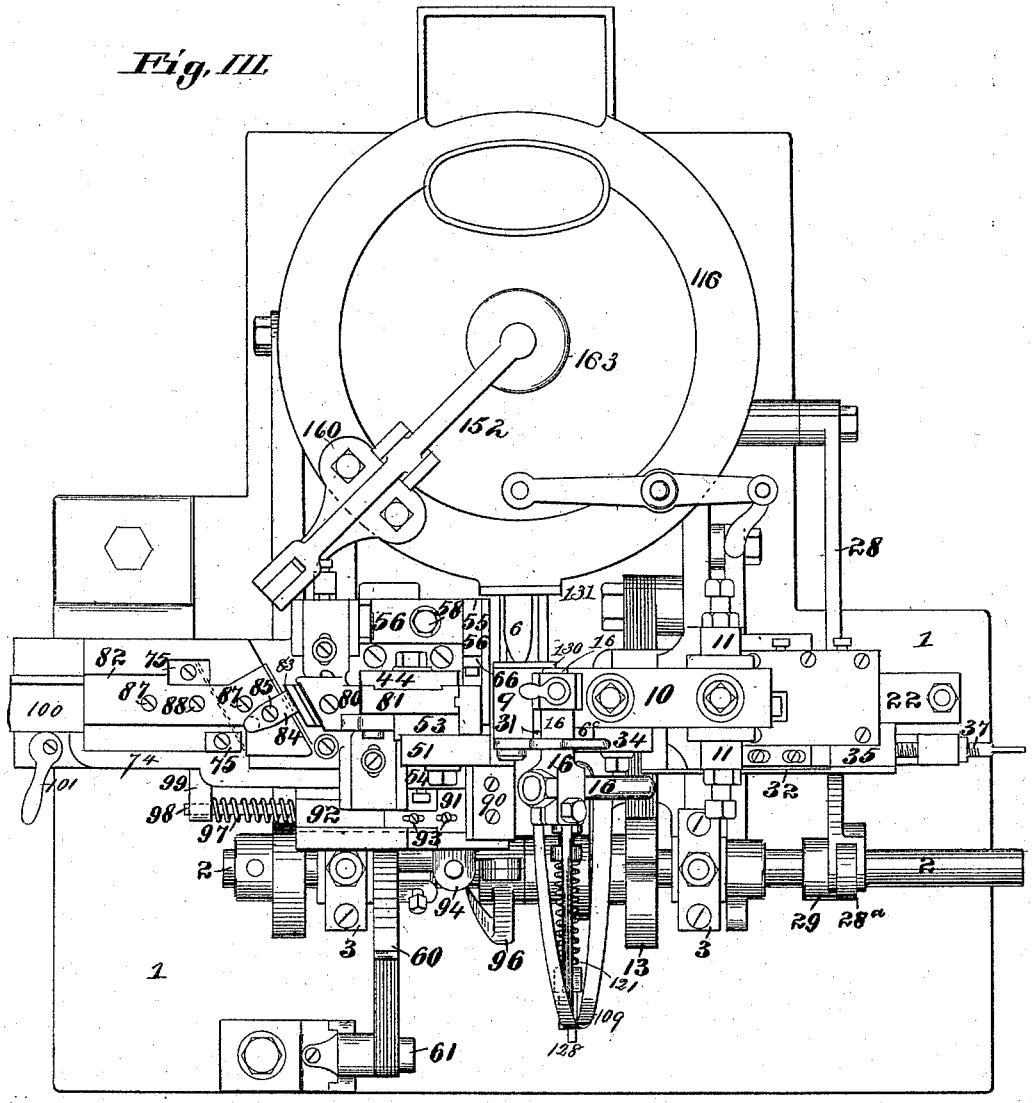

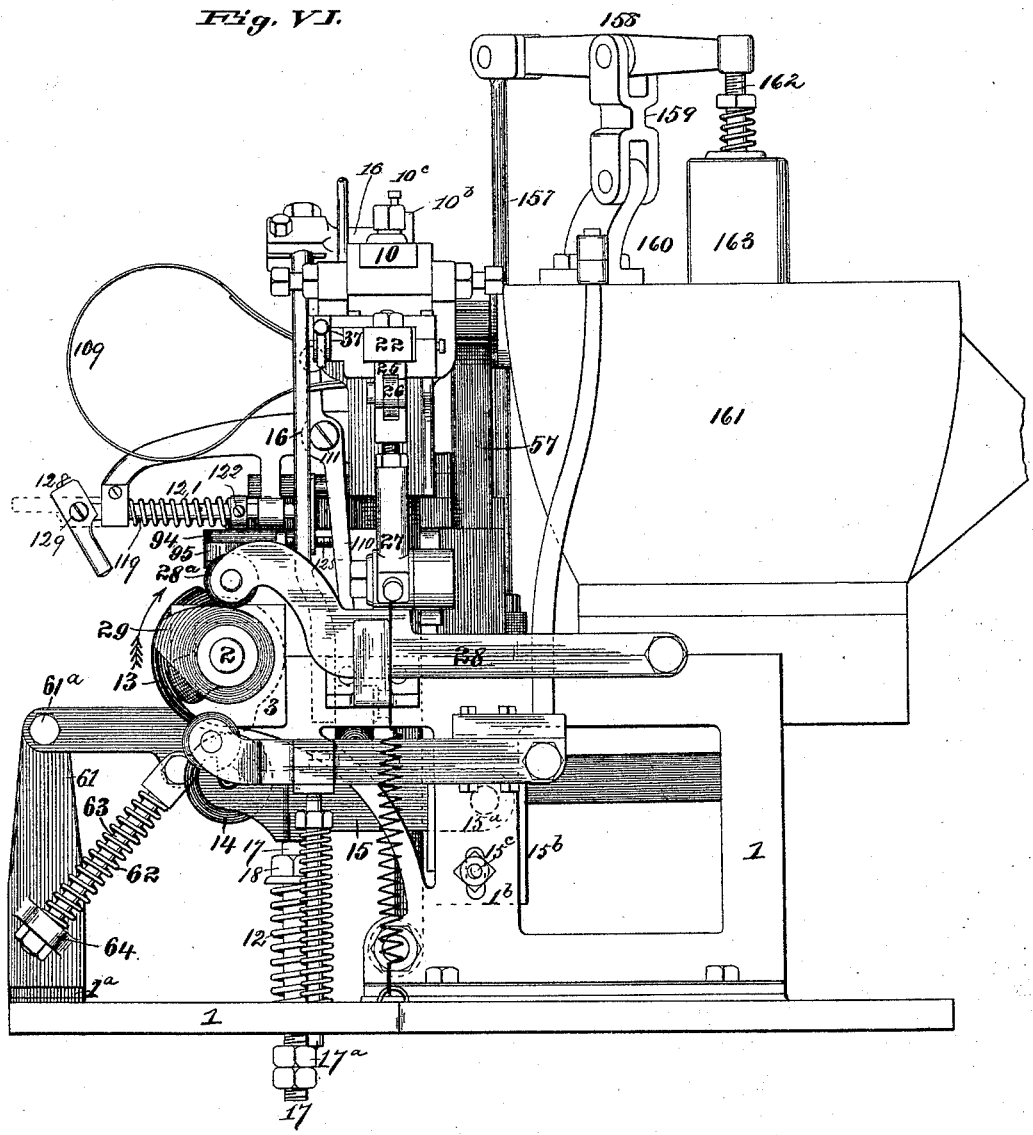

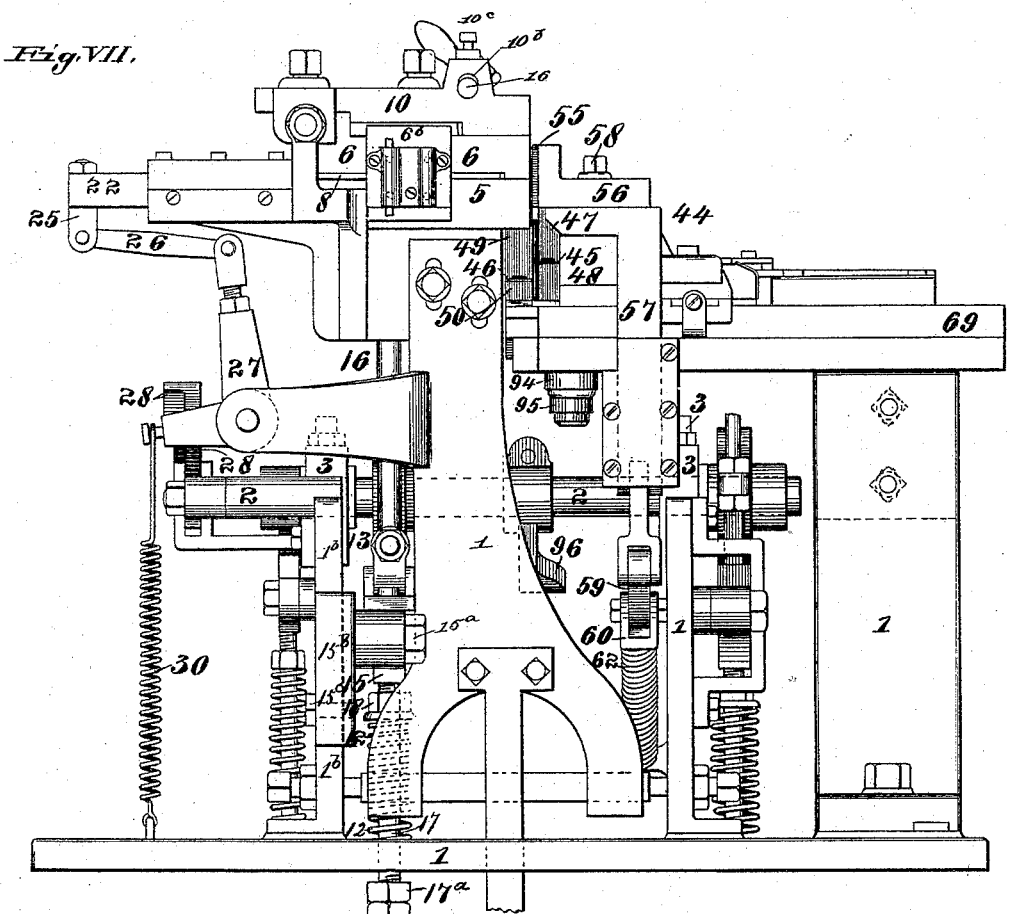

(No Model.) 9 Sheets—Sheet 5.
J. G. PAVYER.
TYPE MACHINE.
No. 495,703. Patented Apr. 18, 1893.
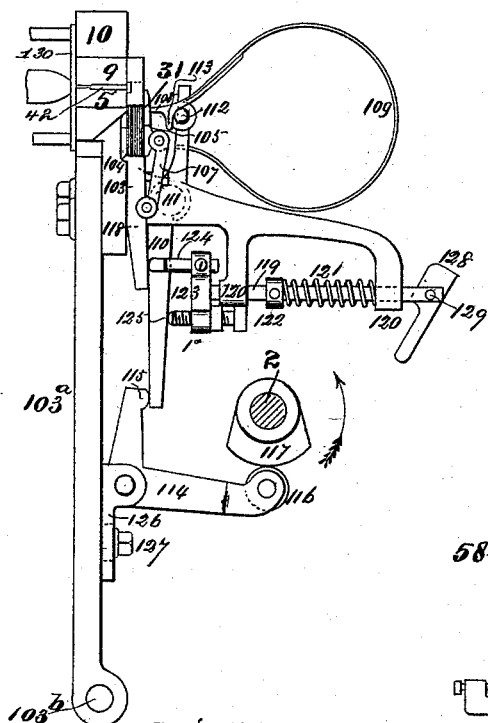
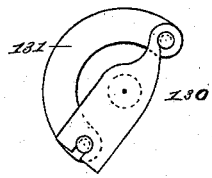
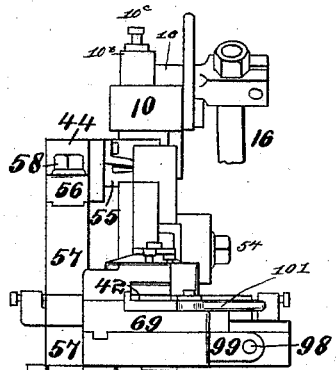
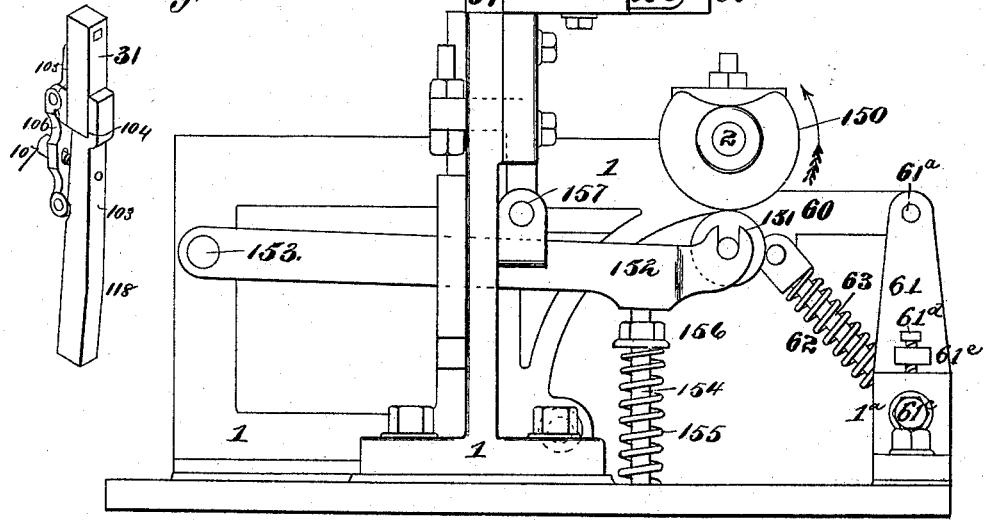

(No Model.) 9 Sheets—Sheet 6.
J. G. PAVYER.
TYPE MACHINE.
No. 495,703. Patented Apr. 18, 1893.
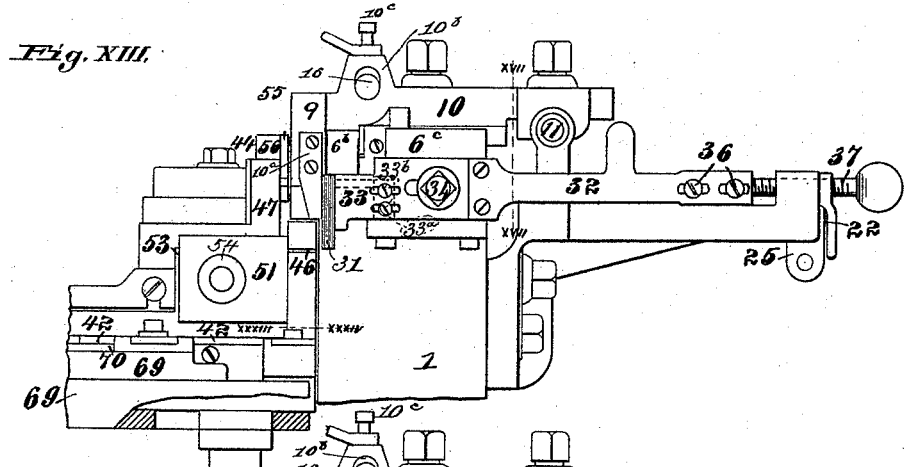
Fig. XIII.
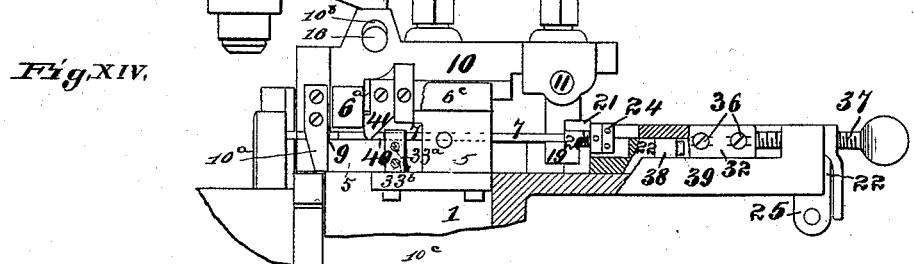
Fig. XIV.
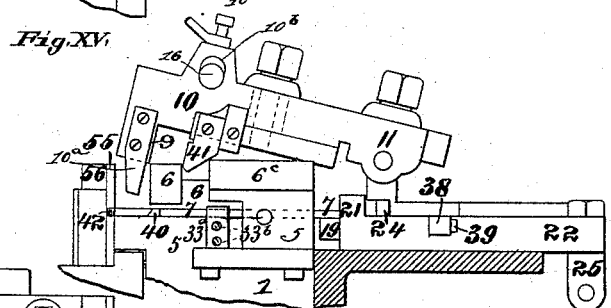
Fig. XV.
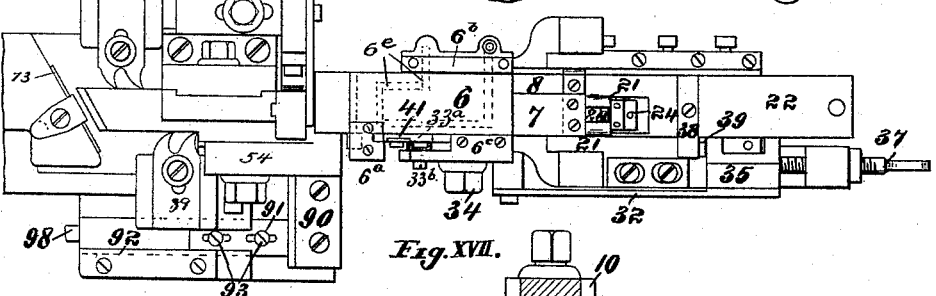
Fig. XVI.
Fig. XVII.
Attest:
Harry S. Rohrer
George E. Cruse
Inventor:
James G. Pavyer.
By Knight Bros.
Attys.

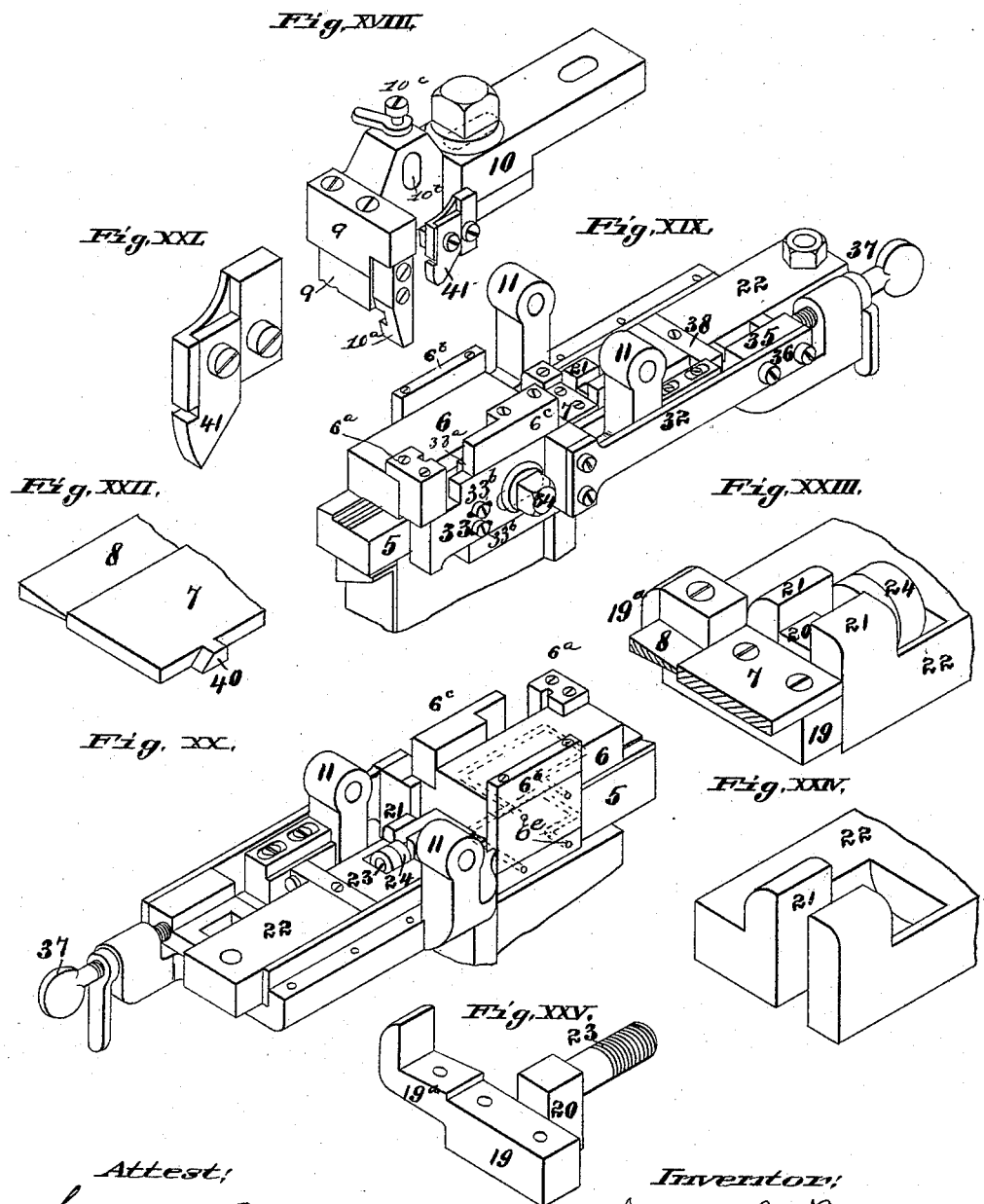

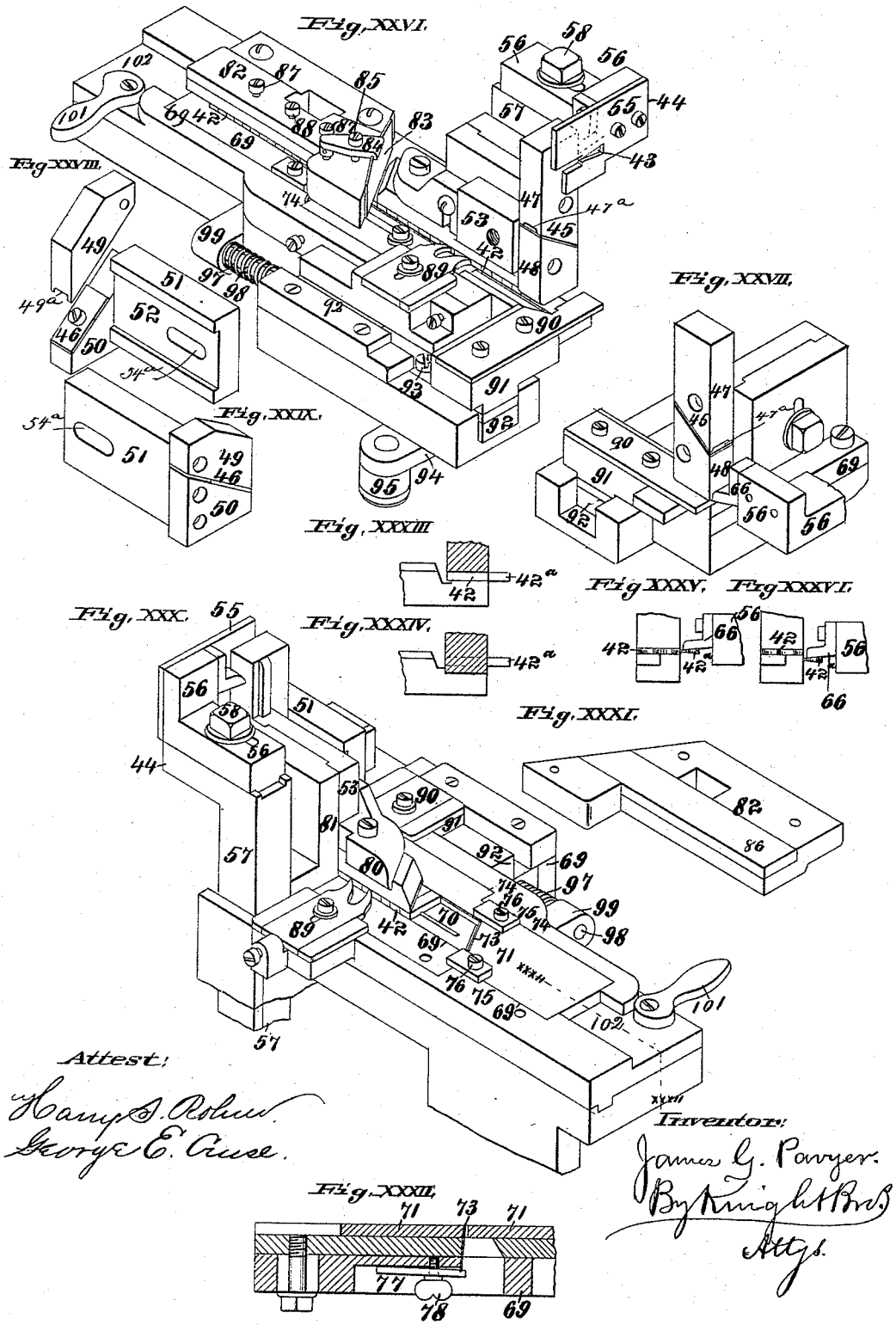

(No Model.)　　　　　　　J. G. PAVYER.　　　9 Sheets—Sheet 9.
TYPE MACHINE.
No. 495,703.　　　　　　　　　Patented Apr. 18, 1893.
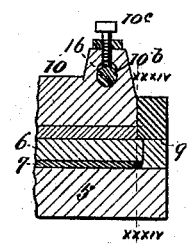
Fig. XXXVII.
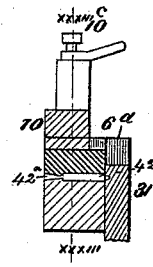
Fig. XXXVIII.
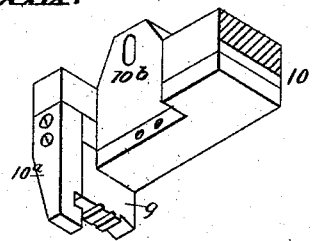
Fig. XXXIX.
Attest:　　　　　　　　　　Inventor:
Wm. E. Knight.　　　　　　James G. Pavyer.
Walter Tauuriss　　　　　　By Knight Bros
　　　　　　　　　　　　　　　Attys.

UNITED STATES PATENT OFFICE.

JAMES G. PAVYER, OF ST. LOUIS, MISSOURI.

TYPE-MACHINE.

SPECIFICATION forming part of Letters Patent No. 495,703, dated April 18, 1893.

Application filed December 7, 1891. Serial No. 414,330. (No model.)

*To all whom it may concern:*

Be it known that I, JAMES G. PAVYER, of the city of St. Louis, in the State of Missouri, have invented a certain new and useful Improvement in Type-Machines, of which the following is a full, clear, and exact description, reference being had to the accompanying drawings, forming part of this specification.

This improvement relates to the means for discharging the types from the molds and dressing them. The features claimed as novel will be set forth in the claims.

In the drawings:—Figure I is a front elevation of the machine with the parts in the position they have when the type is being cast. Fig. II is a vertical, longitudinal section taken at II—II, Fig. I, showing the down feed cam and lever in elevation, the extreme position of the lever being shown by dotted lines. Fig. III is a top view of the machine. Fig. IV is a detail elevation of the vertical or down feed device in the upper position, and Fig. V is a view of same parts in lower position. Fig. VI is an elevation of right hand end of the machine with the parts in same position as seen in Fig. I. Fig. VII is a rear elevation of the machine with the kettle removed. Fig. VIII is a detail, vertical transverse section taken at VIII—VIII, Fig. I. Fig. IX is a detail elevation of frame carrying the matrix, &c., with the cam shaft in transverse section at IX—IX, Fig. I. Fig. X is a perspective view of the matrix and holder. Fig. XI is a detail elevation of the left-hand end of the machine. Fig. XII is a detail elevation of the nipple-plate. Fig. XIII is a detail elevation of the mold and dressing device. Fig. XIV is a detail elevation of the mold and holder partly in section, and Fig. XV is a detail elevation of same parts with the upper or movable member of the mold lifted. Fig. XVI is a top view of the parts shown in Fig. XIII, except that the movable member of the mold is removed. Fig. XVII is a vertical transverse section taken at XVII—XVII, Fig. XIII. Fig. XVIII is a perspective view of the movable member of the mold. Fig. XIX is a perspective view of lower member of the mold, &c., and Fig. XX is a rear perspective view of same. Fig. XXI is a detail perspective view of the cam for insuring the proper relative position of the pusher with the rest of the mold when casting the type. Fig. XXII is a detail perspective view of the front portion of the pusher. Fig. XXIII is a detail, perspective view showing the connection of the slide and pusher. Fig. XXIV is a detail, perspective view showing part of the slide. Fig. XXV is a detail, perspective view of the connecting piece between the slide and pusher. Fig. XXVI is a detail front perspective view of the dresser in normal position. Fig. XXVII is a detail rear perspective view of the dresser with the pusher advanced. Fig. XXVIII is an inside perspective view of the knife and holder detached. Fig. XXIX is an outside perspective view of the knife and holder. Fig. XXX is a perspective view of the dresser looking at the discharge end. Fig. XXXI is a detail perspective view of the removable top plate of the dresser. Fig. XXXII is a detail, vertical longitudinal section, taken at XXXII—XXXII, Fig. XXX. Fig. XXXIII is a detail, horizontal section taken at XXXIII—XXXIII, Fig. XIII. Fig. XXXIV is a detail, horizontal section, taken at XXXIV—XXXIV, Fig. XIII. Fig. XXXV is a detail elevation showing the type in position to be broken, and Fig. XXXVI is a similar view except that the jet is shown just broken from the type and the breaker in its lowest position. Fig. XXXVII is a detail longitudinal section of the mold taken at XXXVII — XXXVII, Fig. XXXVIII. Fig. XXXVIII is a transverse section of the mold taken at XXXVIII — XXXVIII, Fig. XXXVII. Fig. XXXIX is a detail under perspective view, showing part of the upper or movable member of the mold.

1 is the main frame.

2 is the cam-shaft having bearings in the frame at 3.

4 is a pulley or balance wheel upon the shaft to receive a drive belt. The machine may, however, be driven by hand.

The mold has four principal parts, two of which are stationary and two moving. The lower member 5 is fixed to the frame and forms the base of the mold and the bottom of the recess in which the types are cast. The upper stationary member 6 is vertically adjustable on the member 5 to give means for casting types of different thicknesses. The member 6 forms the top of the type recess.

The right hand side of the type recess is formed by the pusher which works between the parts 5, 6 and has a main part 7 having a cross section similar to one vertical side of the type without the jet while the other part 8 of the pusher has a cross section equal to a vertical side of the jet. The left hand side of the type recess is formed by the inner face of the part 9 forming the down-turned end of the upper movable member 10 of the mold, that is connected to the base or lower member 5 by a hinge 11. Blocks $6^b$ and $6^c$ form guides for the back and front sides respectively of the movable member 10. The member 10 is thrown up by a spring 12 and drawn down into working position by a cam 13 acting on an anti-friction roller 14 having bearing in a lever 15 connected with the member 10 by a rod 16.

In Fig. XVIII, $10^b$ is the socket receiving the end of the lifting rod 16, and $10^c$ the screw by which the said end is held in engagement.

The spring 12 surrounds a rod 17 having vertical movement and whose upper end bears against the bottom of the lever 15.

18 is a nut screwing on the rod 17 and against the bottom of the nut the upper end of the spring bears, the lower end of the spring having bearing upon a fixed part of the main frame.

The rod 17 passes loosely through the base of the frame, and in order to limit the ascent of the mold piece 10 the rod carries a stop nut $17^a$ that impinges against the bottom of the base for the above purpose. The stop nut is held in place by a jam nut, as seen in Figs. I, VI and VII. The purpose of this adjustment is to fit the mold for the casting of types of different sizes, the larger types requiring the piece 10 to be moved up higher to allow them to pass beneath it. The fulcrum $15^a$ of the lever 15 is also made adjustable for the same purpose, said fulcrum being on a vertically adjustable plate $15^b$ having lips embracing an upright $1^b$ of the main frame and held in position by a bolt $15^c$ passing through a vertical slot in the plate $15^b$ and screwing into the upright, see Figs. I, VI, VII, VIII.

When the parts 5, 6, 7, 8, 10 of the mold are in the position seen in Figs. I, VII, XIII, XIV the mold is ready for the casting of the type. When the type has been cast the member 10 is thrown up and the pusher 7, 8 moves leftward and pushes the type from the mold. The body 7 of the pusher is connected in any suitable way to a piece 19 having a part 20 fitting within the yoke 21 of a slide 22. 23 is a screw stud projecting from the part 20 and carrying a nut 24 bearing against the horns of the yoke 21. The part 8 of the pusher which bears against the jet may be attached to a projection $19^a$ of the piece 19, as seen in Fig. XXIII, or may be connected with the slide 22 in any other way. The slide 22 has at the under side and right end an ear 25 connected by a link 26 to the upright arm of a bell crank 27. The side arm of this bell crank bears on a lever 28 that carries an anti-friction roller $28^a$ that bears upon a cam 29 upon the cam shaft 2. The side arm is connected by a draw-spring 30 to the frame of the machine, the office of the spring (30) being to draw the side arm down and thus draw the pusher to the right into its normal position, the purpose of the cam 29 being to move the pusher to the left and eject the type from the mold, see Figs. I and VII.

The matrix 31 is held in the usual or any suitable manner. 32 is a bar having a detachable part 33 which bears against the right side of the matrix and which is secured to the lower member 5 of the mold by a screw 34 passing through a slot allowing endwise adjustment of the bar. The bar 32 carries on the inner side a block 35 that is secured to it by screws 36 passing through slots in the bar, and screwing into the block so that the block may be adjusted to right or left upon the bar.

37 is a screw whose point bears against the block to resist the force of blows against the left end of the block.

38 is a projection on the front side of the slide 22 which carries a knob or screw 39 that impinges against the block 35 as the pusher reaches its normal position. This insures the correct position of the slide.

40 is a projection on the side of the pusher whose left side is engaged by an inclined cam 41 upon the part 10 of the mold as said part reaches its lower position, see Figs. I, III, XIII, XIV, XVI and XIX.

$33^a$ is an adjustable stop block on the inner side of the part 33, this block being attached to the part 33 by screws $33^b$ that pass through longitudinal slots in the part 33 and screw into the block $33^a$. The block $33^a$ is so placed that the right edge of the projection 40 comes in contact with the block as the pusher reaches its normal (or right hand) position, the projection 40 being thus held between the block $33^a$ and the cam 41. This construction insures the correct position of the pusher. The pusher being attached to the slide by a joint that allows its removal there may occur a slight loss of motion at the joint, so that I have adopted a stop device for both the pusher and slide, the latter receiving the chief part of the concussion, see Figs. XIII, XIV, XV, XVI and XIX.

When the type 42 is pushed from the mold it enters an aperture 43, open at both sides, in plate 55 of the down carrier 44. The aperture has the same form as the type, see Figs. IV and XVI. The type remains in the recess while it is carried down the vertical passage between cutters or knives 45 and 46 by which two sides opposite to each other are dressed. The construction of this part of the machine is illustrated in the figures on Sheet 8 of the drawings. The knife 45 is clamped between the oblique faces of blocks 47, 48 fixed to the part $1^a$ of the main frame. The knife 46 is held between the oblique faces of the blocks 49, 50 which are in turn attached to an adjustable block 51 having a channel 52 that receives a projection 53 of the main frame. The clamping blocks 47 and 49 are channeled as seen at 47ª and 49ª, respectively, for the escape of the metal scraped from the type. The block 51 is attached to the projection 53 by a screw 54 passing through a longitudinal slot in the block and screwing into the projection. The plate 55 of the down carrier having the aperture 43 is attached to an adjustable block 56 fitting the top of the vertical slide 57 and adjustable thereon by means of a screw 58 passing through a slot in the block. The slide 57 is connected by a link 59 to a lever 60 fulcrumed at 61ª to a vertically adjustable plate 61 and pushed upward by a spring 62 that surrounds a rod 63 pivoted to the lever and passing through an eye 64 upon the plate 61. The spring has bearing, at its ends, upon the eye 64 and forked end of the rod. The lever is depressed by a cam 65 upon the main shaft. It will be seen that the greater part of the working face of the cam is concentric with the shaft so that the down carrier 44 remains in its lower position for a time. During this stay in the lower position the type is pushed horizontally from the recess 43 and the pusher withdrawn from the recess. The type is pushed from the recess into the passage in which it passes between cutters or knives above and below it, and by cutters by which its base is grooved; but before passing between the cutters the jet or sprue 42ª is broken from it, see Figs. I, II, III, IV and V.

In making types of different sizes it is necessary that the plate 55 should be carried up to a different elevation so as to bring the aperture into a proper position to receive the types the plate being changed in cases where the size varies above a certain degree. In order to enable this adjustment the socket 64 is upon the vertically adjustable plate 61. The plate 61 has lips 61ᵇ bearing against the edges of the standard 1ª and is secured in position by a bolt 61ᶜ passing through a vertical slot in the standard and screwing into the plate 61, thus the fulcrum 61ª of the lever 60 is adjusted in position for the purpose stated.

61ᵈ is a screw working in a lug 61ᵉ of the plate 61 and bearing on top of the standard 1ª to give means of adjustment and vertical support to the plate, see Figs. I, II, VI and XI.

The jet projects from the passage or way in which the body of the type is contained, and is snapped off by the blow of the breaker 66. The breaker is attached to the block 56 on the slide 57 in such a position as to be above the jet as the type is left by the pusher after discharge from the recess 43. While the concentric part of the cam 65 is in contact with the lever 60 the recess 43 is level with the passage into which the type is pushed. At the end of the concentric part is a projection consisting preferably of an adjustable block 67 which causes the lever and slide 57 to move rapidly down for a little distance and the breaker knocks the jet from the type. The block 67 is shown by dotted lines to be connected to the body of the cam by a screw 70 passing through a slot in the block and into the cam, and to have a heel screw 68 resting against the shoulder of the cam, see Fig. II.

69 is the bed plate of the horizontal way along which the types pass in the dressing of the two other sides. This bed plate has steel plates 70 and 71 let in flush with its top and made with oblique ends between which is set the knife or cutter 73 by which the lower side of the pipe is dressed.

74 is a rib whose inner edge bears against the edges of the plates 70 and 71 and which has shoulders bearing against the ends of these plates.

75 are plates secured to the bed plate by screws 76 and bearing on the top edge of the knife limiting the ascent of the knife. The knife is held up by a plate 77 beneath it, secured to the bottom of the bed-plate by a screw 78, see Figs. XXX and XXXII. The bed plate is supported on a standard 79 of the main frame. The top plate of the type passage is composed of two parts, both of them vertically adjustable to suit types of different sizes. Of these parts the one 80 is attached to the upright guide 81 of the down-feed slide 44. The other part 82 is attached to the bed plate 69. These parts have oblique ends between which is held the knife 83. The knife 83 is held down by a plate 84 attached to the plate 82 by a screw 85. The lower edge of the knife may rest upon a distance block near each end and having equal depth with the type being dressed, see Fig. XXVI to XXXII inclusive. It is preferred that the surface of the passage against which the types rub should be of steel to lessen friction and wear. The steel plate 86 may be connected to the plate 82 by screws 87 and pressed down by a screw 88 between them, thus giving means for vertical adjustment.

89 is an adjustable cutter by which the lower end of the type is grooved. Additional cutters such as 89 are provided for acting on both ends of the blanks, to produce quads which carry no letters or other characters.

In Fig. XXVI the plate 82 is shown in position. In Fig. XXX said plate is removed and in Fig. XXXI the plate is shown inverted. As the types pass through the passage their upper and lower sides are dressed and their lower ends grooved, removing any roughness left in breaking off the jet.

90 is the pusher by which the types are pushed through the passage. The pusher is secured to a block or bracket 91 secured to a slide 92 by screws 93 passing through longitudinal slots in the block and into the slide, and means of attachment allowing the longitudinal adjustment of the block 91 on the slide. The slide has an arm 94 carrying an anti-friction roller 95 that is acted on by the cam 96 to throw the slide to the left. The slide is moved to the right by a spring 97 surrounding a pin 98 and bearing at its ends upon the slide and a fixed projection 99 having a hole through which the pin 98 passes. It will be understood that the line of types 42 is moved a small distance each time by the left-ward movement of the pusher, see Figs. I, II, XXVI and XXX.

100 is a stick to receive the types from the machine. The receiving end of this stick is secured in the recess 102 by the cam 101, see Figs. III, XXVI and XXX.

The matrix 31 is secured to a bar or lever 103 in the usual manner, the lower end of the matrix resting in an angular recess 104 in the top of the lever. This recess is open on the outer side and upon that side is a pressure block 105 pivoted to the top of a link 106 whose lower end is pivoted to the lever 103.

107 if a screw passing loosely through the central part of the link and screwing into the lever. By turning this screw inward the block 105 is pressed against the matrix and the latter is held rigidly to the lever 103. The pressure block has a usual recess near its upper end to receive the point 108 of the usual supporting spring 109.

110 is a usual lever fulcrumed to the frame at 111 and resting against the front side of the lever 103. The lever 110 has near its upper end a side pin 112 that bears against a shoulder 113 on the spring 109.

114 is a bell crank having a projection 115 bearing against the inner side of the lever 110 near the lower end of the lever. The horizontal arm of the bell-crank carries an anti-friction roller 116 which is pushed downward by a cam 117 on the shaft 2. The action of the cam 117 is to push the upper end of the matrix hard against the mold, such action taking place when a type is being cast. The matrix holding lever 103 has a fulcrum bearing at 118 against the base plate 5 of the mold, so that when the lower end of the lever 103 is pushed inward the top of the matrix is moved outward from the mold disclosing the letter on the end of the type and leaving the type free to be pushed sidewise from the mold.

119 is a sliding rod working in bearings 120. 121 is a spring on the rod whose outer end presses against the outer bearing 120 and whose inner end presses against a collar 122 fixed to the rod by a set screw or other means.

123 is a cross-head on the rod 119, carrying at the upper end an adjustable piece 124 bearing against the outer side of the lever 103 near the lower end of the lever. The push piece 124 passes freely through the cross-head and is held in position by a screw, as shown. It will be seen that when the cam 117 is inactive the spring 121 will force the lower end of the lever 103 inward and carry the matrix away from the mold. In order to assist the outer movement of the matrix the upper end of the lever 110 is moved backward by a screw 125 in the cross-head 123 pressing against its outer side near the lower end. The bracket 126 to which the bell-crank 114 is fulcrumed is secured to the frame by a screw 127 passing through a vertical slot in the bracket as indicated by dotted lines in Fig. IX. The slide-rod may be held forward by a cam 128 working in a longitudinal slot of the rod and turning on a pin 129. The cam is constructed to work against the outer bearing 120 when in action, see Figs. I, VI, IX and X.

Locking piece $10^a$ depending from the front side of the movable member 10, acts as a guide to the latter, and when member 10 is down in the position shown in Fig. XIII, bears against the left side of the matrix 31. The block $6^b$ between the upper part of the guide and matrix locking piece $10^a$ and the cam 41 forms the upper stop or bearing for the matrix.

In Fig. XII, 130 is the nipple plate, and 131 the bracket or plate to which it is connected. This device is in common use and has no direct bearing on the present invention.

The shaft 2, carries a cam 150, which engages a friction roller 151 on the lever 152, pivoted at 153, to the frame 1. Beneath the lever 152 is a vertical rod 154 working through the lever 152, and surrounded by a spring 155, such spring having bearing against the base of the machine at its lower end, and against a nut 156, at its upper end. The whole arrangement is such that the cam forces the lever 152 downward, through contact with the friction roller 151, while the spring performs the function of elevating the lever as the cam revolves, and the reduced portion of the latter comes in contact with the friction roller. Pivoted to the lever 152 is a pump-operating rod 157, that is connected at its upper end to the working beam 158, pivoted in a link 159 connected to a bracket 160. The bracket 160 is mounted on top of the usual kettle 161. 162 is the operating rod of the jet pump, said rod working in the cylinder 163.

No novelty is claimed herein in connection with the pump, or its actuating devices.

The dotted lines $6^e$ in Fig. XX, also shown in Fig. XVI, represent water-tubes passing through the mold to keep it cool.

I claim herein as new and of my invention—

1. The mold for a type machine, composed of a fixed bottom, 5, a stationary but removable top 6, a pusher 7, having endwise movement, a matrix, a hinged part 10, forming one side of the mold, and means for independently operating the matrix and the hinged part 10, substantially as and for the purpose set forth.

2. The pusher having a part 7 working between the fixed bottom and top parts of the mold and constituting one side of the type recess, and a part 8, of a cross section, equal to a vertical side of a jet, substantially as set forth.

3. The combination with the pusher 7 and hinged member 10 of the mold, of the projection 40 on the pusher and cam 41 on the mold member 10, adapted to operate substantially as and for the purpose set forth.

4. The combination of the pusher 7 having a projection 40, the movable member 10 of the mold having a cam 41, the slide 22 connected to the pusher and having a projection 38, and the bar 32 having a projection 35, all constructed and adapted to operate substantially as set forth.

5. The combination of the pusher 7 having a part 8, the cross section of which is equal to a vertical side of a jet of a type, the slide 22, the bell crank 27 connected with the slide and to a spring 30, the lever 28 with anti-friction roller $28^a$, and a rotating cam 29, all arranged and adapted to operate substantially as set forth.

6. The combination, with a pusher adapted to push the type from the mold in a substantially horizontal direction, of a down-carrier 44 having an aperture 43 adapted to receive the type, and vertical guides carrying knives 45, 46, between which the type passes in its downward movement, substantially as, and for the purpose set forth.

7. The combination of the down carrier 44 having a plate 55 with an aperture 43 adapted to receive the type, a vertical passage with knives 45, 46, upon the sides down which the plate and type pass, a pusher 7 working horizontally and adapted to pass through the recess and push the type therefrom, and a horizontal passage having dressing knives 73, 83 at bottom and top, substantially as, and for the purpose set forth.

8. The combination, in a type machine, of the vertical and horizontal passages with dressing-knives upon opposite sides, the down carrier 44, having a type recess 43, the pusher 7, working in said recess the horizontal pusher 90 and the jet breaker 66 upon the down carrier slide 57, substantially as, and for the purpose set forth.

9. The combination, in a type-machine, of the down-carrier having a plate 55 with recess 43 adapted to receive the type the pusher 7, a type passage between guides as 47, 48, 49, 50 with knives 45 and 46, a jet breaker the slide 57 to which the latter is attached, a horizontal dressing passage and a pusher 90, all constructed and adapted to operate substantially as set forth.

10. The combination, in a type machine, of the down-carrier 44 having the plate 55 with type recess 43, the pusher 7 vertical guides with knives 45, 46 at opposite sides, jet breaker 66, a horizontal passage for the types, pusher 90 adapted to push the type from the vertical into the horizontal passage, lever 60 the down-carrier slide 57 carrying the jet breaker and to which said lever is connected and rotary cam 65 with projection 67, all constructed and adapted to operate substantially as set forth.

11. The combination of the down carrier 44, having a type recess 43 cutters between which the down-carrier passes, a cam lever connected to the down carrier and having an adjustable fulcrum a rotary cam acting on said lever and a pusher 7 received by said recess, all constructed and adapted to operate substantially as set forth.

12. The combination of the down-carrier 44 having a type recess 43, cutters between which the down-carrier passes a cam lever connected to the down-carrier and having an adjustable fulcrum, a rotary cam adapted to depress the lever, a spring adapted to lift the lever, and a pusher adapted to push the type from the recess, substantially as set forth.

13. The combination with the down-carrier 44 having a type recess, cutters between which the down-carrier passes, and a pusher received by the recess, of a cam lever connected to the down-carrier, a cam adapted to depress the lever, a stop rod carrying a spring adapted to lift the lever and passing loosely through an eye, and a nut upon the rod adapted to impinge against the edge and limit the upward movement of the lever, substantially as set forth.

14. The combination, with a pusher having a projection 40 and forming one side of the type recess in the mold of a type machine, of the cam 41 upon the lifting piece 10 of the mold and the adjustable stop-block $33^a$ located to one side of projection 40, substantially as, and for the purpose set forth.

15. The combination with the lifting piece 10 of the mold of the lifting rod 16, the cam lever 15 having an adjustable fulcrum, a cam adapted to depress the lever, bolt 17 bearing against or attached to the lever and passing loosely through the base 1, lifting spring 12 and a stop nut $17^a$ on the bolt beneath the base, substantially as set forth.

16. The combination with the matrix levers 103 and 110 the former being located in front of the latter and the spring device for pushing their lower ends inward substantially as described, of the bell crank 114 and and cam 117 adapted to press the matrix to the mold and to retract said spring device, substantially as set forth.

JAMES G. PAVYER.

Witnesses:
 SAML. KNIGHT,
 J. M. MAROT.